United States Patent
Croswell

(12)
(10) Patent No.: US 6,412,325 B1
(45) Date of Patent: Jul. 2, 2002

(54) METHOD FOR PHOTOTYPING PARTS FROM SHEET METAL

(75) Inventor: Edward M. Croswell, Metamora, MI (US)

(73) Assignee: 3 Dimensional Services, Rochester Hills, MI (US)

( * ) Notice: Subject to any disclaimer, the term of this patent is extended or adjusted under 35 U.S.C. 154(b) by 0 days.

(21) Appl. No.: 09/275,132

(22) Filed: Mar. 23, 1999

(51) Int. Cl.[7] .......................... B21D 43/28; B21K 27/06
(52) U.S. Cl. .................. 72/324; 72/342.1; 72/379.2
(58) Field of Search .............. 72/379.2, 342.1, 72/324

(56) References Cited

U.S. PATENT DOCUMENTS

| | | | |
|---|---|---|---|
| 3,854,859 A | * 12/1974 | Sola | 425/466 |
| 3,938,657 A | * 2/1976 | David | 206/343 |
| 5,148,900 A | * 9/1992 | Mohan | 72/379.2 X |
| 5,157,852 A | * 10/1992 | Patrou et al. | 40/160 |
| 5,390,782 A | * 2/1995 | Sinn | 206/63.3 |
| 5,568,680 A | * 10/1996 | Parker | 72/379.2 X |
| 5,709,913 A | * 1/1998 | Andersen et al. | 428/34.5 |

* cited by examiner

Primary Examiner—Allen Ostrager
Assistant Examiner—William Hong
(74) Attorney, Agent, or Firm—Gifford, Krass, Groh, Sprinkle, Anderson & Citkowski, P.C.

(57) ABSTRACT

A method for prototyping parts from a sheet metal blank in which the sheet metal has at least two spaced edges. The method includes the step of forming a plurality of longitudinally aligned slots through the sheet metal blank to form a bend line extending between two spaced edges on the sheet metal blank. The slots are preferably formed by laser cutting. The sheet metal blank is then bent along the bend line to form the prototype.

4 Claims, 1 Drawing Sheet

METHOD FOR PHOTOTYPING PARTS FROM SHEET METAL

BACKGROUND OF THE INVENTION

I. Field of the Invention

The present invention relates to a method for prototyping parts from sheet metal.

II. Description of the Prior Art

In many industrial applications, it is necessary to prototype parts from sheet metal before production stamping dies are made. Such prototypes enable the manufacturer to ensure that the part, when finally manufactured on a production basis, will meet the design and assembly requirements of the production part.

There have been a number of previously known methods for constructing prototypes from sheet metal. One such method has been to bend the sheet metal along the desired bend line using a bending brake. The use of a bending brake, however, is suitable only for very simple parts. As the complexity and number of the bends increase for the part, a bending brake cannot be used since the shape of the part interferes with the operation of the bending brake.

Consequently, in order to construct prototypes from sheet metal for more complex shapes, it has been the previous practice to construct temporary stamping dies. Such temporary stamping dies, while less expensive than production dies, are nevertheless expensive to manufacture. Furthermore, the construction of temporary dies is a time consuming process thus increasing the overall time required to construct the prototype.

SUMMARY OF THE PRESENT INVENTION

The present invention provides a method for prototyping parts from sheet metal which overcomes all of the above-mentioned disadvantages of the previously known methods.

In brief, in the method of the present invention, a plurality of longitudinally aligned spots are formed through the sheet metal between two edges of the sheet metal thus forming a bend line. Any number of bend lines can be formed through the sheet metal blank depending upon the complexity of the prototype.

Preferably, a laser is utilized to cut the longitudinally aligned slots through the sheet metal blank. Other methods, however, can alternatively be used to form the slots in the blank.

Preferably, the slots are approximately $\frac{1}{32}$ of an inch in width. Additionally, the length of each slot is between one and three times the spacing between adjacent slots so that approximately 50%–75% of the metal from the sheet metal blank is removed along each bend line.

In practice, it has been found that a sheet metal blank up to ¼ of an inch thick having bend lines formed in accordance with the present invention may be easily bent by hand.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
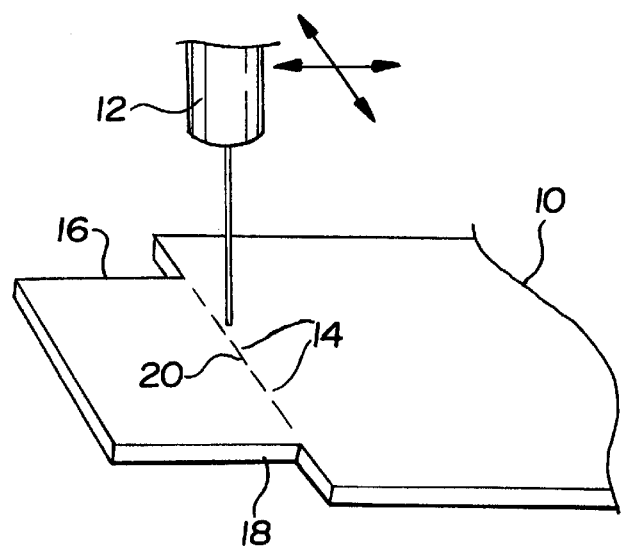
FIG. 1 is a diagrammatic view illustrating the preferred method of the present invention.
Figure 2:
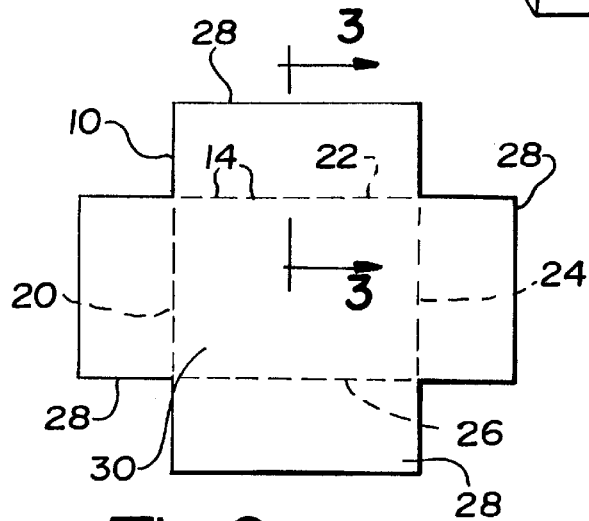
FIG. 2 is a top plan view of a sheet metal blank in accordance with the present invention.

With reference first to FIGS. 1 and 2, a sheet metal blank 10 for forming a prototype is there shown. The sheet metal blank 10 is flat and may be up to ¼ inch thickness. The shape of the sheet metal blank 10 shown in the drawing is for illustration purposes only. In practice, the sheet metal blank 10 may be of any desired shape, including more complex shapes.

Referring now particularly to FIG. 1, a laser 12 is preferably used to form a plurality of longitudinally aligned slots 14 through the sheet metal blank 10. The longitudinally aligned slots 14 extend between two edges 16 and 18 of the sheet metal blank 10 thus forming a bend line 20 between the edges 16 and 18 of the sheet metal blank 10.

With reference now particularly to FIG. 2, the sheet metal blank 10 is there illustrated having four bend lines 20, 22, 24 and 26 thus delineating four outwardly extending tabs 28 from a main body portion 30 of the sheet metal blank 10.

Figure 3:
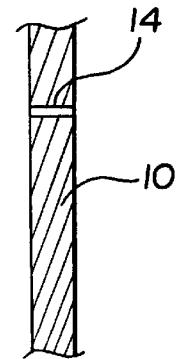
FIG. 3 is a sectional view taken substantially along line 3—3 in FIG. 2 and enlarged for clarity.

Referring now to FIGS. 2 and 3, the length of the slots 14 formed along each bend line 20–26 is between one and three times the spacing between adjacent slots 14. Consequently, between 50% and 75% of the metal from the sheet metal blank 10 is removed along each bend line 20–26 by the laser 12.

Each slot 14 is preferably narrow in width, and preferably approximately $\frac{1}{32}$ of an inch wide. Furthermore, although the slots 14 may vary in length along a bend line, preferably the slots along each bend line 20–26 are equal in length to each other.

Figure 4:
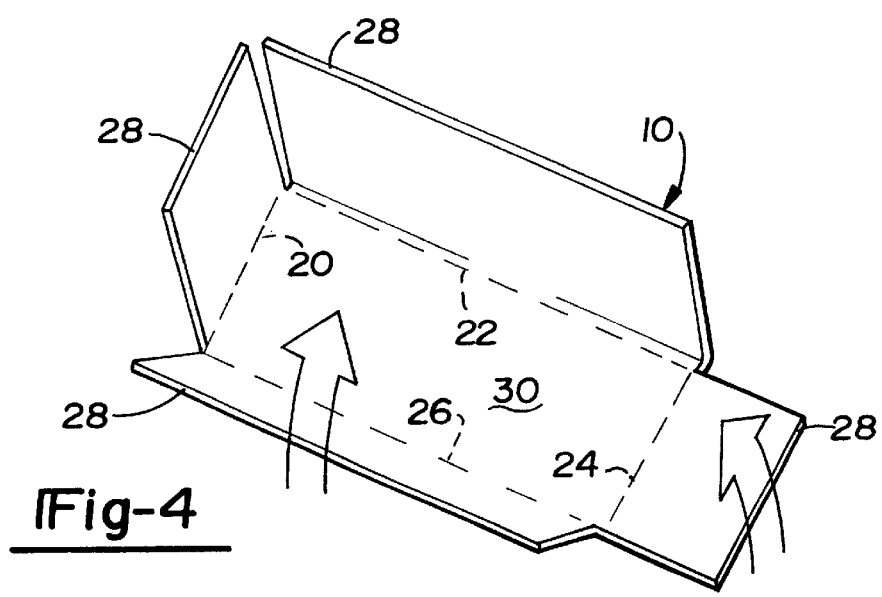
FIG. 4 is an elevational view illustrating the formation of a prototype in accordance with the preferred embodiment of the present invention.

With reference now to FIG. 4, after the slots 14 have been formed through the sheet metal blank 10, the sheet metal blank 10 can be easily bent along its bend lines 20–26 by merely using manual or hand force. Thus, as shown in FIG. 4, the tabs 28 are manually bent along the bend lines 20–26 to form the finished prototype in which the tabs 28 are bent away from the main body portion 30 of the sheet metal blank 10.

From the foregoing, it can be seen that the present invention provides a simple, rapid and yet highly effective method for forming prototypes from sheet metal blanks. Having described my invention, however, many modifications thereto will become apparent to those skilled in the art to which it pertains without deviation from the spirit of the invention as defined by the scope of the appended claims.

I claim:

1. A method for prototyping parts in preparation for production manufacturing of the parts by stamping dies from a sheet metal blank having spaced edges comprising the steps of:

forming a plurality of longitudinally aligned slots by laser cutting through the sheet metal blank so that said slots form a bend line extending between two spaced edges of the sheet metal blank, said slots extending entirely through said sheet metal blank thereby forming openings in said sheet metal blank, bending the sheet metal blank along said bend line to form the prototype.

2. The invention as defined in claim 1 wherein said forming step further comprises the step of forming said slots so that the length of each slot is between one and three times the spacing between adjacent slots.

3. The invention as defined in claim 2 wherein the length of each slot is substantially twice the spacing between adjacent slots.

4. The invention as defined in claim 1 wherein said forming step further comprises forming slots substantially identical in length to each other.

* * * * *